United States Patent
Borghese et al.

(10) Patent No.: US 12,119,746 B2
(45) Date of Patent: Oct. 15, 2024

(54) CIRCUIT WITH VOLTAGE CONTROLLED OSCILLATOR (VCO) CIRCUIT AND PULSE-WIDTH MODULATED (PWM) SIGNAL GENERATOR, AND METHOD

(71) Applicant: STMicroelectronics S.r.l., Agrate Brianza (IT)

(72) Inventors: Marco Borghese, Milan (IT); Mattia Carrera, Garlasco (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 225 days.

(21) Appl. No.: 17/807,466

(22) Filed: Jun. 17, 2022

(65) Prior Publication Data

US 2022/0416656 A1 Dec. 29, 2022

(30) Foreign Application Priority Data

Jun. 29, 2021 (IT) .................. 102021000017048

(51) Int. Cl.
*H02M 3/158* (2006.01)
*H02M 1/00* (2006.01)

(52) U.S. Cl.
CPC ......... *H02M 3/158* (2013.01); *H02M 1/0016* (2021.05); *H02M 1/0022* (2021.05); *H02M 1/0025* (2021.05)

(58) Field of Classification Search
CPC ............. H02M 1/0016; H02M 1/0022; H02M 1/0025; H02M 3/158; H02M 3/156
See application file for complete search history.

(56) References Cited

U.S. PATENT DOCUMENTS

| | | | |
|---|---|---|---|
| 8,963,519 B2 | 2/2015 | Zambetti et al. | |
| 2010/0253309 A1* | 10/2010 | Xi .................. | H02M 3/156 323/288 |
| 2012/0182003 A1* | 7/2012 | Flaibani .............. | H02M 3/156 323/284 |
| 2013/0057240 A1 | 3/2013 | Zambetti et al. | |
| 2014/0132236 A1* | 5/2014 | Darmawaskita ...... | H02M 3/156 323/283 |
| 2016/0301303 A1 | 10/2016 | Bari et al. | |

FOREIGN PATENT DOCUMENTS

CN 105262337 A 1/2016

* cited by examiner

*Primary Examiner* — Kyle J Moody
*Assistant Examiner* — Jye-June Lee
(74) *Attorney, Agent, or Firm* — Slater Matsil, LLP (57) ABSTRACT

In an embodiment a circuit includes a voltage-controlled oscillator (VCO) circuit having a first node configured to receive a reference voltage, a second node configured to receive a feedback signal, which is a comparison signal, indicative of a variation of a regulated output voltage of an electronic voltage regulator with respect to the reference voltage and a third node configured to provide a clock signal having a clock period based on the reference voltage and the feedback signal, and a pulse-width modulated (PWM) signal generator circuit having a first node coupled to the VCO circuit and configured to receive the clock signal, a second node configured to receive an input signal proportional to an input voltage signal at an input node of the electronic voltage regulator and a third node configured to provide at least one PWM drive signal to one or more electronic switches of a switching stage based on the clock signal.

19 Claims, 4 Drawing Sheets

CIRCUIT WITH VOLTAGE CONTROLLED OSCILLATOR (VCO) CIRCUIT AND PULSE-WIDTH MODULATED (PWM) SIGNAL GENERATOR, AND METHOD

CROSS-REFERENCE TO RELATED APPLICATIONS

This application claims the priority of Italian Patent Application No. 102021000017048, filed on Jun. 29, 2021, which application is hereby incorporated herein by reference.

TECHNICAL FIELD

The description relates to electronic converter circuits, such as switching voltage regulator circuits, for instance. The description relates also to power management integrated circuits (briefly, PMICs).

BACKGROUND

Switching DC-DC converters (or voltage regulators) can be operated using a Constant On-Time (briefly, COT) control mode. COT envisages comparing a falling slope of a voltage level output by the DC-DC converter to a reference threshold, regulating the output voltage level based on this ripple as a result.

A first approach suitable for COT operation is disclosed, e.g., in U.S. Pat. No. 8,963,519 B2 which discusses a switching voltage regulator including a comparison module configured to receive a reference voltage and a feedback voltage and to generate a comparison signal based on a difference between the reference voltage and the feedback voltage, and a control module configured to generate a gain control threshold signal based on at least one of the reference voltage and the feedback voltage. The control module may be configured to control a duration of a PWM pulse based on the at least one of the reference voltage and the feedback voltage; the feedback voltage may be a regulated output voltage of the switching voltage regulator.

Another approach for COT control mode operations is used in EP3026893A1 which discusses a method for controlling a converter of the multiphase interleaving type comprising the steps of: detecting when a change of the load applied to an output terminal of the converter occurs; simultaneously turning on all the phases of the converter; and recovering a driving interleaving phase shift to restart a normal operation of the converter. A controller for carrying out this method is also described.

Existing solutions for COT control mode operation of a switching voltage regulator suffer from one or more of the following limitations:
- present a constant small signal (modulator) gain, with a consequently fixed loop bandwidth to respond to load transients (that is, small signal variations of the output voltage level),
- limited dynamic performance of the regulator due to the fixed bandwidth,
- if an increasing load causes a negative change in output voltage level, the modulator may undesirably vary the duty cycle by acting on the switching frequency of the converter;
- the presence of an additional singularity on the signal path could degrade the phase margin of the loop as the desired target bandwidth (GBWP) grows,
- may introduce increased complexity and static consumption, for instance due to stringent constrains for performances of circuit components or because of introducing a nonlinear secondary loop and extra passive components (internal or external) to implement a high-pass filtering of the output voltage,
- non-linear solutions can hardly lead to analytical design approaches,
- may not be suitable for low power applications due to power usage,
- may be sensitive to a shape of the (output) ripple.

SUMMARY

Embodiments contribute to overcoming the aforementioned limitations.

One or more embodiments relate to a corresponding electronic converter.

One or more embodiments relate to a corresponding method.

One or more embodiments may present one or more of the following advantages:
- a possibility is provided to locally alter the gain of the modulator,
- providing a boost for positive load transients is facilitated,
- faster response and lower drop in the output regulated voltage can be achieved, which facilitates countering under voltage failures and reducing recourse to output capacitive arrays to contain output voltage drop,
- drops in output voltage in response to sustained positive load transients are mitigated,
- circuit design is made largely independent of the load transient profile,
- circuit complexity, size, consumption and implementational cost are reduced,
- the number of active blocks in the path of the error signal is likewise reduced,
- constraints placed on performance of circuit blocks are relaxed, which facilitates maintaining stability of a main regulation loop.

BRIEF DESCRIPTION OF THE DRAWINGS

One or more embodiments will now be described, by way of non-limiting example only, with reference to the annexed Figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The drawings are in simplified form and are not to precise scale.

Throughout the figures annexed herein, like parts or elements are indicated with like references/numerals and a corresponding description will not be repeated for brevity.

The references used herein are provided merely for convenience and hence do not define the extent of protection or the scope of the embodiments.

For the sake of simplicity, in the following detailed description a same reference symbol may be used to designate both a node/line in a circuit and a signal which may occur at that node or line.

Figure 1:
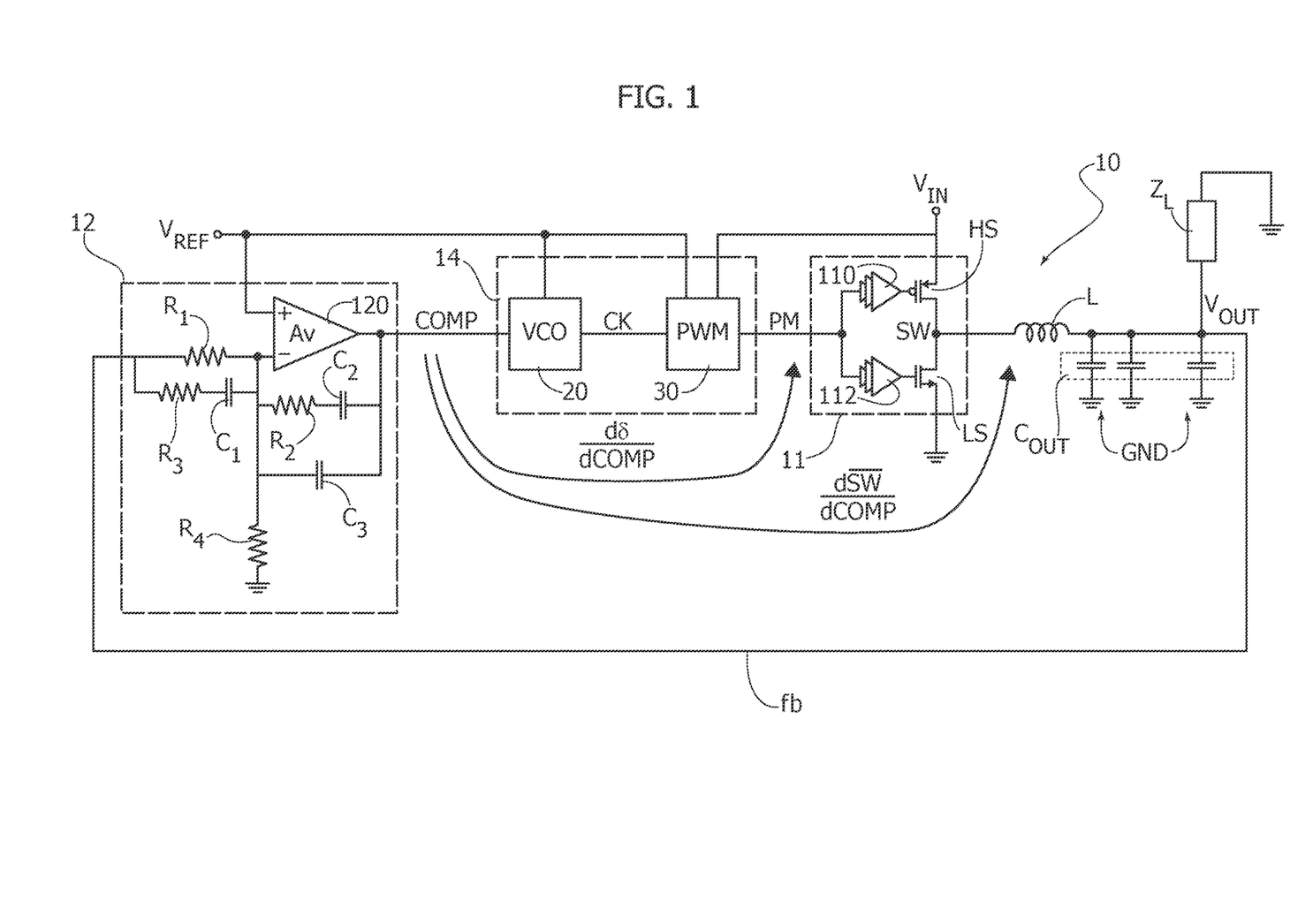
FIG. 1 shows a diagram exemplary of an embodiment of an architecture of an electronic converter circuit as per the present disclosure.

As exemplified in FIG. 1, a voltage regulator circuit 10 comprises:
- at least one input node $V_{IN}$ configured to be coupled to a main source of electrical energy (briefly, mains) to receive an input power supply signal $V_{IN}$ therefrom;
- at least one output node $V_{OUT}$ configured to be coupled to a load $Z_L$ to provide an output voltage level $V_{OUT}$ thereto,
- a switching circuit block 11 comprising a pair of electronic switches LS and HS (with the current path thereof) coupled (e.g., directly) between the output node $V_{OUT}$ and the input node $V_{IN}$, the electronic switches LS, HS configured to receive the power supply signal $V_{IN}$ and to provide as output (e.g., based on a control signal PM) a switching signal to a switching node SW, which is intermediate the electronic switches LS, HS.

Specifically, the electronic switch HS is a high-side switch coupled (e.g., directly) between the (input) node $V_{IN}$ and the switching node SW, and the electronic switch LS is a low-side switch connected (e.g., directly) between the switching node SW and ground GND.

In the example considered, the (high-side) switch HS and the (low-side) switch LS hence represent a half-bridge configured to couple the switching node SW to the output node $V_{OUT}$ or ground GND. For example, the switches LS and/or HS are often transistors, such as n-channel or p-channel Metal-Oxide-Semiconductor Field-Effect Transistors (nMOS or pMOS FETs), for instance.

As exemplified in FIG. 1, the voltage regulator 10 comprises at least one inductor L, coupled (e.g., directly) between the switching node SW and the output node $V_{OUT}$ and at least one capacitor $C_{OUT}$ connected (e.g., directly) between the output node $V_{OUT}$ and ground GND.

As exemplified in FIG. 1, the converter circuit 10 further comprises a feedback branch fb coupling the output node $V_{OUT}$ to a control arrangement 12, 14 configured to provide a control signal PM to drive switches LS, HS in order to regulate the output voltage level, as discussed in the foregoing. For instance, the switches LS, HS have respective control nodes coupled to respective driving circuits 110, 112 which control a state of the respective switches based on a control signal PM.

In the example considered, the control arrangement 12, 14 comprises:
- a reference voltage node $V_{REF}$ configured to receive a reference voltage level $V_{REF}$, for instance equal to a DC operating point value or signal level,
- a compensator circuit block 12 coupled to the reference voltage node $V_{REF}$ and configured to receive the reference voltage level $V_{REF}$ therefrom, the compensator circuit block 12 further coupled to the output node $V_{OUT}$ via the feedback branch fb, the compensator circuit block 12 configured to provide a compensated signal COMP indicative of a variation of the regulated output voltage $V_{OUT}$ with respect to a reference voltage $V_{REF}$ to a modulator circuit block 14, the compensator circuit block 12 further configured to provide stability thereto, e.g., by introducing zero and pole singularities within the voltage regulation loop 12, 14,
- a modulator circuit block 14 coupled to the input voltage node $V_{IN}$, to the compensator circuit block 12 and to the reference voltage node $V_{REF}$, the modulator circuit block 14 configured to receive the input voltage level $V_{IN}$, the compensated signal COMP and the reference voltage level $V_{REF}$ from respective nodes and to provide the control signal PM to the switching circuit block 11.

Specifically, the compensator circuit block 12 may comprise an (operational) amplifier 120 having a first (e.g., non-inverting) node coupled to the reference voltage node $V_{REF}$ and a second (e.g., inverting) node coupled to the feedback branch fb, for instance via a voltage divider arrangement $R_1$, $R_4$, the amplifier 120 having an output node retroactively coupled to the second input node and having a certain amplification gain Av.

As exemplified in FIG. 1, the modulator circuit block 14 comprises:
- a voltage-controlled oscillator (briefly, VCO) circuit block 20 configured to receive the compensated signal COMP and the voltage reference level $V_{REF}$ to produce a clock signal CK, and
- a PWM signal generator circuit block 30 coupled to the VCO circuit block 20 and configured to receive the clock signal CK therefrom, the PWM signal generator circuit block 30 configured to produce a pulse-width modulated (briefly, PWM) control signal PM whose duty cycle δ, namely a fraction $T_{ON}$ of the signal period $T_{SW}$ in which it is at a first "active" level, varies based on the switching frequency set by CK in 20 and the compensated signal COMP, the PWM signal generator circuit block 30 further configured to provide the control signal PM to the switching circuit 11, in particular to the driver circuits 110, 112 of the half-bridge transistor arrangement HS, LS.

For instance, when the value of the control signal PM is "1", the driving circuit no determines the turning on of the high side MOS HS for a time interval $T_{ON}$, which is a fraction of a total switching period $T_{SW}$ and which is determined based on the duty cycle δ of control signal PM.

For instance, in response to a variation of the load $Z_L$, e.g., an increase thereof, the output voltage level $V_{OUT}$ may vary with respect to an expected value of the regulated output voltage $V_{OUT}$. This variation may be detected via the compensator 12 and the modulator 14 may change the switching cycle of the switching arrangement 11 in response to the detected variations, consequently adjusting driving signal PM and restoring the regulated output voltage level $V_{OUT}$.

As exemplified in FIG. 1, e.g., in a frequency domain:
- a first (in particular, small signal) transfer function $d\overline{SW}/dCOMP$ can be defined between a mean value $\overline{SW}$ of the voltage at the switching node SW and the compensated signal COMP, and
- a second (in particular, small signal) transfer function dδ/dCOMP can be defined between a variation of the duty cycle δ of the control signal PM and the compensated signal COMP.

For instance, the first transfer function $d\overline{SW}/dCOMP$ may be expressed as the product of the second transfer function dδ/dCOMP times the input voltage $V_{IN}$.

These transfer functions $d\overline{SW}/dCOMP$, dδ/dCOMP can be useful in discussing working principles in one or more embodiments, as discussed in the following.

In one or more embodiments, the modulator circuit 14 is configured to present a (small signal) transfer function between the (average value of the voltage at the) switching node SW and the compensated signal COMP quadratically proportional to a reciprocal (DC) value of the compensated signal COMP with respect to a reference voltage $V_{REF}$, as discussed in the following.

Figure 2:
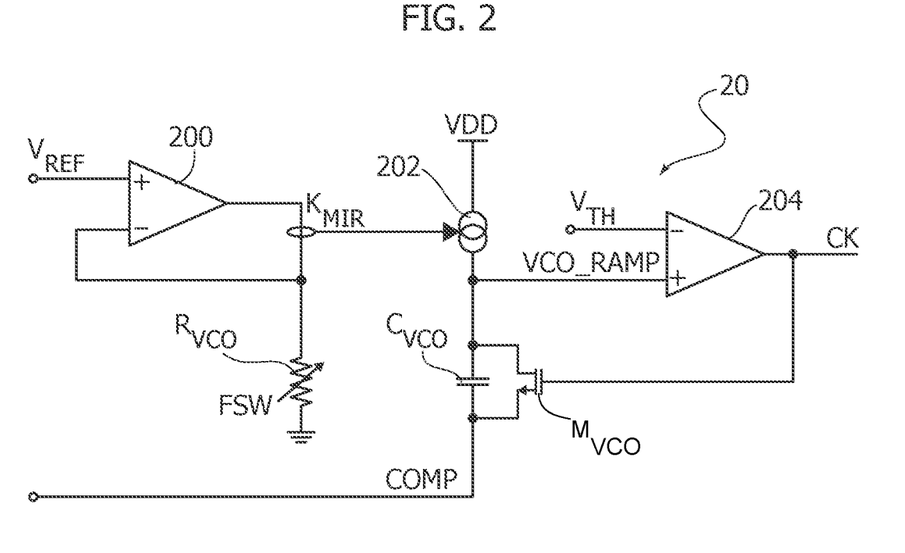
FIG. 2 is a diagram of an exemplary embodiment of a portion of the diagram of FIG. 1.

As exemplified in FIG. 2, the VCO circuit block 20 comprises:
- an operational amplifier 200 configured to receive the voltage reference level $V_{REF}$ and to apply current conversion thereto, the operation amplifier 200 having a first, e.g., non-inverting, node configured to receive the voltage reference level $V_{REF}$, a second, e.g., inverting node coupled to an output node and to a (preferably, trimmable) resistance $R_{VCO}$,
- a biasing branch comprising a current generator 202 configured to produce a current as a replica (e.g., multiplied by a certain mirror factor $K_{MIR}$) of the current flowing throughout the resistance $R_{VCO}$,
- a capacitance $C_{VCO}$ coupled to the current generator 202 and configured to receive the compensated signal COMP,
- a comparator circuit block 204 having a first (e.g., non-inverting) node coupled to the current generator 202 and to the capacitance $C_{VCO}$ and a second (e.g., inverting) node coupled to a threshold level $V_{TH}$ (having a value based on the reference voltage $V_{REF}$, e.g. $V_{TH}=K_{VCO}*V_{REF}$), where the comparator circuit block 204 in the VCO block 20 is configured to receive an integrated signal VCO_RAMP at the first node and to perform a comparison of the integrated signal VCO_RAMP with the reference threshold level $V_{TH}$, providing a clock signal CK as a result of the comparison, the clock signal CK having a first value (e.g., "1") in response to the integrated signal VCO_RAMP crossing the reference threshold level $V_{TH}$ and a second value (e.g., "0") in response to the integrated signal VCO_RAMP failing to reach the reference threshold level $V_{TH}$.

As exemplified in FIG. 2, the output node of the comparator circuit block 204 is coupled to a switch (e.g., a transistor) $M_{VCO}$ having a control node configured to receive the clock signal CK and a current path therethrough configured to be made conductive, bypassing the capacitance $C_{VCO}$ so that, when the voltage VCO_RAMP attains the threshold level $V_{TH}$, the output of the comparator circuit block 204 changes its state, leading to the output clock pulse CK resetting (again) the capacitance $C_{VCO}$ and making the signal VCO_RAMP equal to the compensated signal COMP output by the compensator circuit block 12.

In alternative embodiments of the VCO circuit block 20 as exemplified in FIG. 2, the (e.g., non-inverting) input node of the first amplifier stage 200 may receive the compensated signal COMP from the compensator circuit block 12. For instance, this may further boost modulator gain by an additional constant factor at the cost of giving up the possibility to equalize the DC gain (e.g., $V_{OUT}$/COMP=PART) and the AC (small signal) transfer function $d\overline{SW}/dCOMP$ of the modulator circuit block 14.

In alternative embodiments of the VCO circuit block 20 as exemplified in FIG. 2, the (e.g., non-inverting) input node of the comparator circuit block 204 may be coupled to the threshold $V_{TH}$ while the other (e.g., inverting) input node of the compensator circuit 204 may be coupled to the intermediate current generator 202 and the capacitance $C_{VCO}$. For instance, this leads to modulating the amplitude of the VCO_ramp by acting on the threshold value $V_{TH}$ of the amplifier 204 rather than on the "base" of the VCO_RAMP signal, as discussed in the following. This may be at the cost of having a negative modulator gain, possibly resulting in a reduced stability system.

Figure 3:
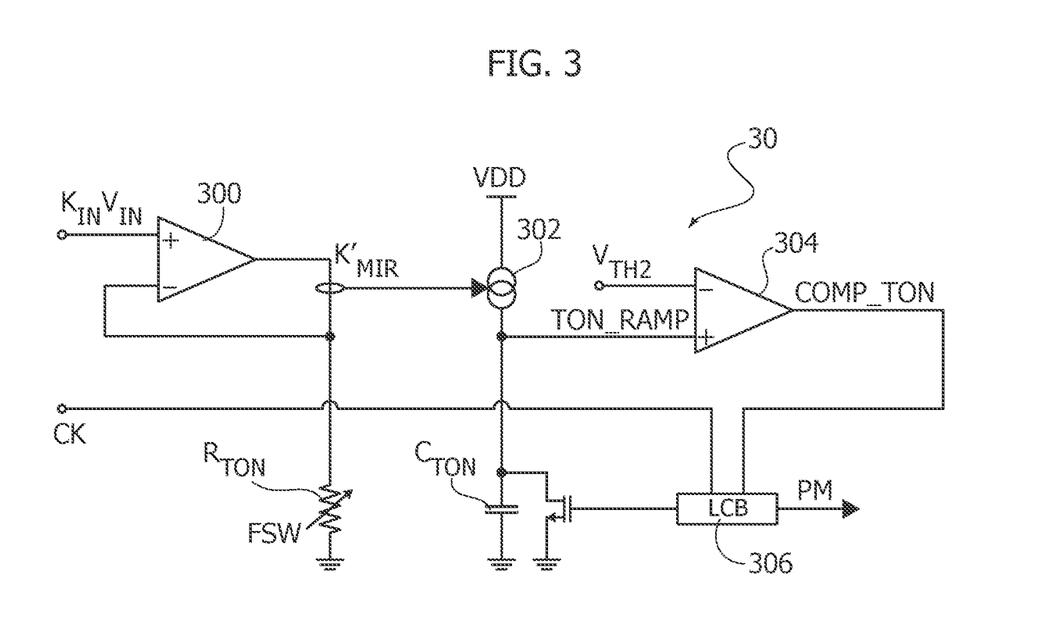
FIG. 3 is a diagram of an exemplary embodiment of another portion of the diagram of FIG. 1.

As exemplified in FIG. 3, the control signal generating block 30 receives clock signal CK produced from the VCO circuit block 20 and receives the input voltage level VIN and based on these it is configured to vary the duty cycle of the control signal PM, setting the $T_{ON}$ time of the high side transistor HS in the switching arrangement 11 as a result.

As exemplified in FIG. 3, the circuit block 30 comprises:
- an operational amplifier 30 configured to receive the input voltage $V_{IN}$, optionally scaled by a factor $K_{IN}$, and to apply current conversion thereto, the operation amplifier 300 having a first, e.g., non-inverting, node configured to receive the input voltage level $V_{IN}$ and a second, e.g., inverting, node coupled to an output node and to a (preferably, trimmable) resistance $R_{TON}$,
- a biasing branch comprising a current generator 302 configured to provide a current that is a replica (e.g., multiplied by a certain mirror factor $K'_{MIR}$) of the current flowing throughout the resistance $R_{TON}$,
- a capacitance $C_{TON}$ coupled to the current generator 302 and to ground, the capacitance configured to provide a voltage signal TON_RAMP, e.g., by integrating the current from the generator 302,
- a comparator circuit block 304 having a first (e.g., non-inverting) node coupled intermediate the current generator 302 and the capacitance $C_{TON}$ and a second (e.g., inverting) node coupled to a threshold level $V_{TH2}$ having a value based on the reference voltage $V_{REF}$, e.g. $V_{TH2}=K_{TON}*V_{REF}$, the comparator circuit block 304 configured to sense the integrated signal TON_RAMP across the capacitance $C_{TON}$ and to perform a comparison of the integrated signal TON_RAMP with the reference threshold level $V_{TH2}$, providing a comparison signal COMP_TON based on the comparison, the comparison signal COMP_TON having a first value (e.g., "1") in response to the integrated signal TON_RAMP crossing the reference threshold level $V_{TH2}$ and a second value (e.g., "0") in response to the integrated signal TON_RAMP failing to reach the reference threshold level $V_{TH2}$. As exemplified in FIG. 3, the PWM signal generator circuit block 30 further comprises a logic circuit block 306 configured to receive the clock signal CK from the VCO circuit block 20 and the comparison signal COMP_TON from the comparator circuit block 304, the logic circuit block 306 configured to provide the control signal PM based on the clock signal CK and the COMP_TON signal, as discussed in the following.

As exemplified in FIG. 3, the logic circuit block 306 is further coupled to a switch configured to discharge the capacitance $C_{TON}$, so that when the voltage TON_RAMP attains the threshold level $V_{TH2}$ the output of the TON comparator circuit block 304 changes its state and its output signal COMP_TON resets the capacitance $C_{TON}$ (and thus the signal TON_RAMP).

A circuit block 30 suitable for use in one or more embodiments is discussed in document U.S. Pat. No. 8,963,519 A1 assigned to STMicroelectronics.

Figure 4A:
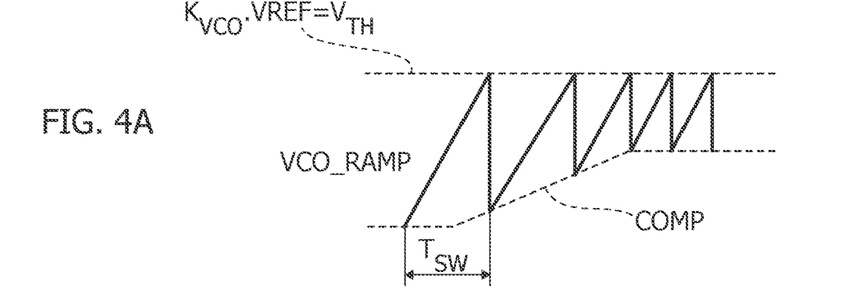
FIGS. 4A and 4B are time-diagrams exemplary of signals in one or more embodiments.

As exemplified in FIG. 4A, the signal VCO_RAMP sensed at the second input node of the comparator circuit block 204 in the PWM circuit block 20 has a fixed slope based on the reference voltage level $V_{REF}$ while the compensated signal COMP output from the compensator circuit 12 (directly) modulates the amplitude of the signal VCO_RAMP. As a result, in response to a sudden increase in output load current (and consequent decrease of the output voltage), for instance, the compensated signal COMP increases; this further results in an increase in switching frequency of the switching arrangement 11.

Specifically, the VCO circuit block 20 produces a clock signal CK that determines a switching period (inverse of the frequency) $T_{SW}$ of the regulator circuit 10, which can be expressed as:

$$T_{SW} = C_{VCO} \cdot R_{VCO} \cdot \frac{K_{VCO} \cdot V_{REF} - COMP}{K_{MIRR} \cdot V_{REF}}$$

As exemplified herein, the clock signal CK has a clock period $T_{SW}$ varying linearly with the feedback signal COMP indicative of a variation of the regulated output voltage $V_{OUT}$ with respect to said reference voltage $V_{REF}$.

Figure 4B:
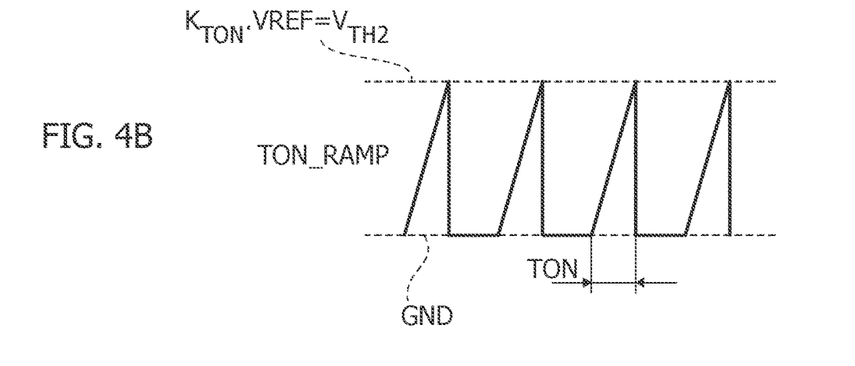

As exemplified in FIG. 4B, the clock signal CK triggers the beginning of a (programmable length) "on" time interval $T_{ON}$ which lasts until the signal TON_RAMP in the PWM signal generator circuit block 30 reaches the reference threshold $V_{TH2}$. For instance, the on-time interval can be expressed as:

$$T_{ON} = C_{TON} \cdot R_{TON} \cdot \frac{K_{TON} \cdot V_{REF}}{K'_{MIR} \cdot K_{IN} \cdot V_{IN}}$$

As a result, the frequency response of the voltage loop shows a closed loop bandwidth a duty cycle $\delta$ of the control signal PM output by the logic circuit block 306 may be expressed as:

$$\delta = \frac{T_{ON}}{T_{SW}} = \frac{C_{TON} \cdot R_{TON}}{C_{VCO} \cdot R_{VCO}} \cdot \frac{K_{TON} \cdot VREF}{K_{MIRR,TON} \cdot K_{IN} \cdot V_{IN}} \cdot \frac{K_{MIRR,VCO} \cdot VREF}{K_{VCO} \cdot VREF - COMP}$$

The second small signal transfer function $$\frac{d\delta}{dCOMP}$$

of the modulator circuit block 14, also referred to as modulator gain GMOD, can be expressed as (e.g., by differentiating the duty-cycle $\delta$ with respect to the compensated signal COMP):

$$\frac{d\delta}{dCOMP} =$$

$$GMOD = \frac{C_{TON} \cdot R_{TON}}{C_{VCO} \cdot R_{VCO}} \cdot \frac{K_{MIRR,VCO}}{K_{MIRR,TON} \cdot K_{IN}} \cdot \frac{K_{TON} \cdot VREF^2}{(K_{VCO} \cdot VREF - COMP)^2} \cdot \frac{1}{V_{IN}}$$

For instance, the first small signal transfer function $$\frac{d\overline{SW}}{dCOMP}$$

may be expressed as the product of the modulator gain GMOD times the input voltage $V_{IN}$:

$$\frac{d\overline{SW}}{dCOMP} = \frac{d\delta}{dCOMP} \cdot V_{IN} =$$

$$GMOD \cdot V_{IN} = \frac{C_{TON} \cdot R_{TON}}{C_{VCO} \cdot R_{VCO}} \cdot \frac{K_{MIRR,VCO}}{K_{MIRR,TON} \cdot K_{IN}} \cdot \frac{K_{TON} \cdot VREF^2}{(K_{VCO} \cdot VREF - COMP)^2}$$

Figures 5A, 5B:
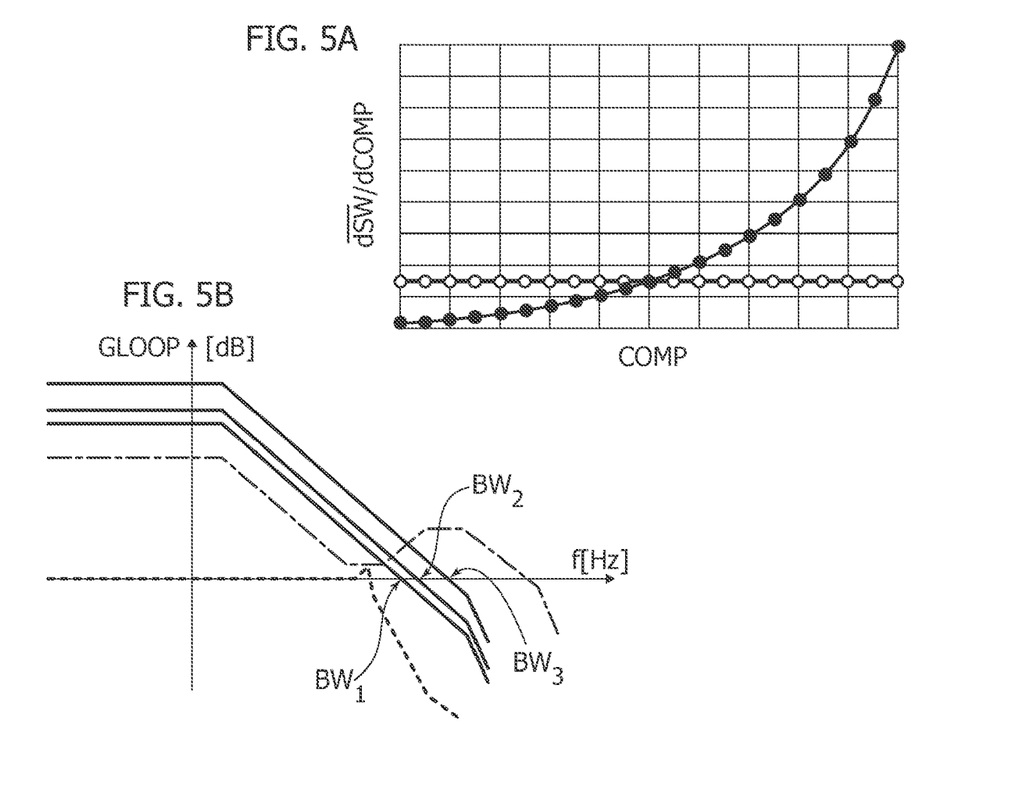
FIG. 5A is a diagram exemplary of a comparison of a transfer function of a circuit as per the present disclosure compared to benchmark solution.
FIG. 5B is a diagram exemplary of a frequency response of an electronic converter circuit as per the present disclosure.

As exemplified in FIG. 5A and according to the expressions above, a hyperbolic relation (represented in circle chain with dark circles in FIG. 5A) exists between the small signal transfer function $$\frac{d\overline{SW}}{dCOMP}$$

and the compensated signal COMP value. Conversely, conventional solutions present a different relation (represented in circle chain with white circles in FIG. 5A). As result, if the compensated signal COMP increases in response to a drop in the regulated output voltage $V_{OUT}$ (e.g., represented in abscissa scale in FIG. 5A), this leads to a reduction in absolute value of the VCO's ramp amplitude, e.g., proportional to the factor ($K_{VCO}$·VREF–COMP), so that the product between the modulator gain GMOD and $V_{IN}$ (represented in ordinate scale in FIG. 5A) grows quadratically.

As exemplified in FIG. 5B, the operation of the feedback loop 12, 14 can be expressed by a total loop gain GLOOP in the frequency domain:

$$GLOOP(s) =$$

$$\frac{COMP}{V_{OUT}}(s) \cdot \frac{SW}{COMP}(s) \cdot \frac{V_{OUT}}{SW}(s) = \frac{COMP}{V_{OUT}}(s) \cdot \frac{d\delta}{dCOMP} \cdot V_{IN} \cdot \frac{V_{OUT}}{SW}(s)$$

As exemplified in FIG. 5B, a complex-conjugate pole pair by the reactive components $LC_{OUT}$ (represented in dashed line) is compensated via the compensation circuit block 12

(represented in chain line), with the dominant pole corresponding to the one tied to the integral part of the compensator, which is limited by the finite open-loop gain of the error amplifier and the feedback partitioning factor given by $R_1$ and $R_4$. For instance, unity gain bandwidth UGBW of the loop 12, 14 can be expressed as the DC gain times the frequency of the dominant pole:

$$UGBW = GBWP = \frac{\frac{d\delta}{dCOMP} \cdot V_{IN}}{2\pi \cdot R_1 \cdot C_2} = \frac{GMOD \cdot V_{IN}}{2\pi \cdot R_1 \cdot C_2}$$

As a result, the frequency response of the voltage loop shows a closed loop bandwidth proportional to the product GOMD·$V_{IN}$. For instance, this extends the quadratic relation of the term $$\frac{d\delta}{dCOMP}$$

into the frequency domain.

As exemplified in FIG. 5B, the bandwidth $BW_{GL}$ of the loop gain GLOOP may locally vary in accordance with the perturbation of the output voltage $V_{OUT}$.

For instance:
in case of a (sudden) drop in the regulated output voltage $V_{OUT}$ and consequent increase of the compensated signal COMP, leading to a faster loop response, the bandwidth (temporarily) varies from $BW_2$ to $BW_3$;
in case of a (sudden) increase in the regulated output voltage $V_{OUT}$ and a consequent decrease in the compensated signal COMP, leading to a local decrease of loop response speed, the bandwidth (temporarily) varies from $BW_2$ to $BW_1$.

It is noted that, according to the quadratic trend represented in FIG. 5A, the increase in bandwidth is greater than the corresponding decrease on compensated signal COMP variation from its DC operating point.

Figure 6A:
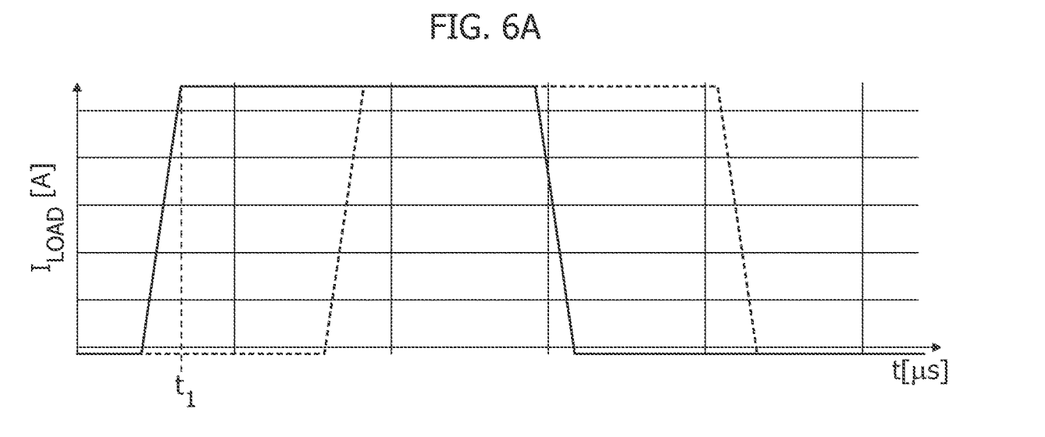
FIGS. 6A and 6B are diagrams exemplary of a way of operating the electronic converter circuit as per the present disclosure.
Figure 6B:
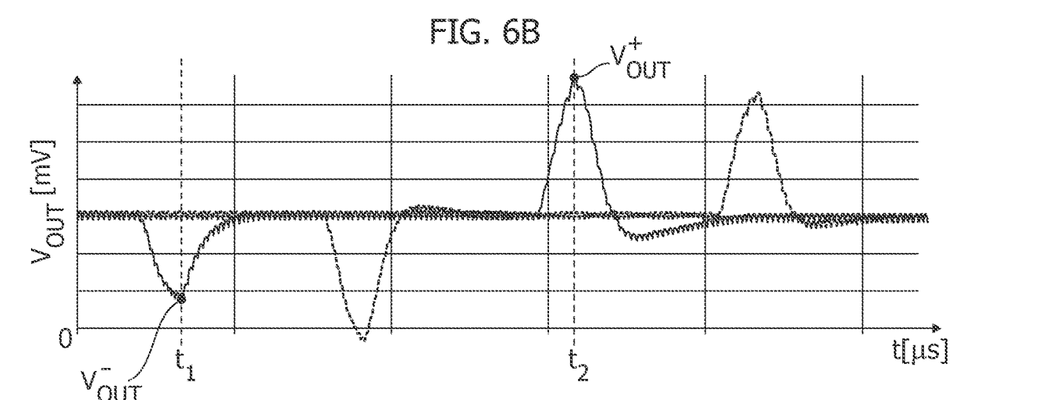

As exemplified in FIGS. 5A, 5B and 6, the performance of the modulator circuit 14 may slightly differ in case of a positive or negative (that is, increase or reduction of) load transient variations.

As exemplified in FIG. 6A:
at a first time $t_1$, a positive load (current) variation (represented in solid line) is detected via the feedback chain 12, 14, and
at a second time $t_2$, a negative load (current) variation is detected via the feedback chain 12, 14.

As exemplified in FIG. 6B:
at time $t_1$, the feedback chain is triggered in response to the variation of the output load $Z_L$, limiting its variation to a first limit value $V_{OUT}^-$,
at time $t_2$, the feedback chain 12, 14 is again triggered in response to the variation of the output load $Z_L$, limiting its variation to a second limit value $V_{OUT}^+$.

As exemplified in FIG. 6B, the first and second limit values $V_{OUT}^-$, $V_{OUT}^+$ may be different, which defines an "asymmetrical" behaviour of the circuit 10 with respect to a notionally symmetrical arrangement represented in dashed lines in FIGS. 6A and 6B.

As exemplified in FIGS. 5A and 6B, the boost in the modulator gain during positive load transients is linked to the bandwidth of the regulation loop 12, 14 being locally modulated to higher values. This may result in a better performance, with a lower drop of output voltage $V_{OUT}$ with respect to existing solutions. Conversely, the reduced decrease in bandwidth with respect to negative load transient variations makes the modulator 14 solely slightly less responsive than existing solutions.

Figure 7:
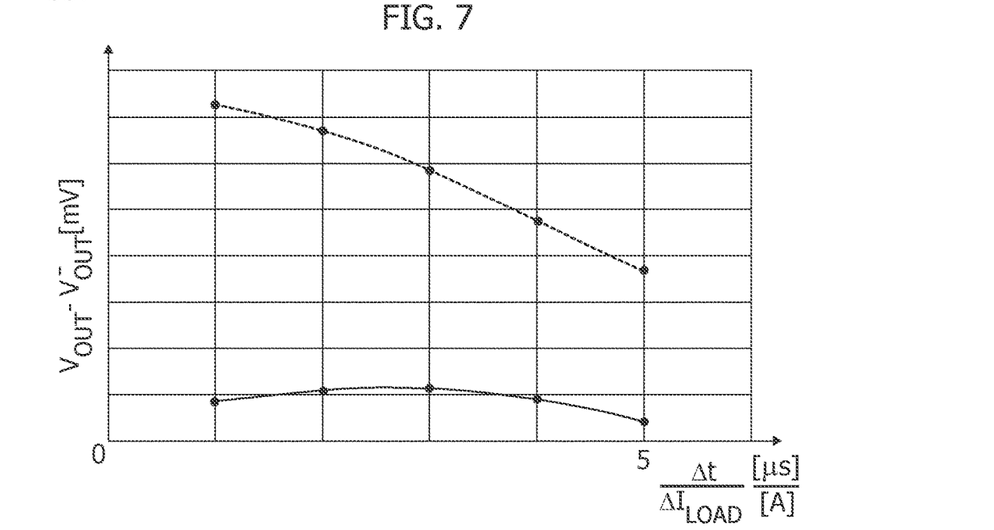
FIG. 7 is diagrams exemplary of performance benchmarking of a solution as per the present disclosure.

FIG. 7 shows a deviation of output voltage Vout from its regulated (DC) value (e.g., difference of $V_{OUT}$-$V_{OUT}^-$) against a step variation of the load (current) with a certain amplitude range (e.g., $\Delta I_{LOAD}$ in a range 1.875 A to 7.5 A) and duration in time (in particular, $\Delta t$ about 1 μs, 2 μs, ..., 5 μs). As exemplified in FIG. 7, the bandwidth boost during positive load transient variations is also capable of compensating for a faster (positive) load transient at a same load variation step, reducing an otherwise larger $V_{OUT}$ drop as in existing solutions (represented in dashed lines), in particular with respect to document U.S. Pat. No. 8,963,519 B2 discussed above.

As exemplified herein, the modulator circuit block 14 is capable of increasing its bandwidth via a larger deviation of the compensator output voltage COMP from its nominal DC value (resulting in a locally smaller VCO ramp). Compared to known solutions, this results in a lower $V_{OUT}$ drop upon a positive load step, which is nearly independent of load transient signal profiles.

One or more embodiments may provide custom adjustability of switching frequency $F_{SW}$ (reciprocal of the switching period $T_{SW}$), for instance by selecting a different target output voltage $V_{REF}$, or independently from input supply $V_{IN}$ which can be maintained by selecting a suitable DC operating point of the modulator 14 as per the present disclosure.

As mentioned, the duty cycle δ can be expressed as the ratio of on-time $T_{ON}$ and switching period $T_{SW}$, or equivalently as the product of on-time $T_{ON}$ and switching frequency $F_{SW}$ of the PWM control signal PM generated to control the power section 11. For instance, the duty cycle δ can be set to be equal to a ratio of output $V_{OUT}$ and input $V_{IN}$ voltage levels, which can be expressed as:

$$\delta = T_{ON} \cdot F_{SW} = \frac{V_{OUT}}{V_{IN}}$$

For a given duty cycle δ, a suitable modulator 14 facilitates maintaining the above relation and providing (custom) programmability.

For instance, the modulator 14 may be configured according to a constant on-time $T_{ON}$ architecture. To this end, it is possible to use the PWM signal generator circuit block 30 to set the constant on-time TON for a given target output regulated voltage $V_{OUT}$, switching frequency $F_{SW}$ and input voltage $V_{IN}$. For instance, this may be expressed by rearranging the expression for on-time $T_{ON}$, yielding:

$$\frac{V_{OUT}}{F_{SW} \cdot V_{IN}} = T_{ON} = \tau_{T_{ON}} \cdot \frac{V_{TH2}}{K'_{MIR} \cdot K_{IN} \cdot V_{IN}}$$

where $\tau_{T_{ON}} = C_{T_{ON}} R_{T_{ON}}$ is a constant value and $V_{TH2} = K_{TON} V_{REF}$ is the reference threshold value for the PWM signal generator circuit block 30.

In one or more embodiments, a (custom-)programmable on-time $T_{ON}$ exploits the generation circuit 30 to provide the generated on-time $T_{ON}$ directly proportional to the desired regulated output voltage $V_{OUT}$, and inversely proportional to the target switching frequency $F_{SW}$ and input voltage level $V_{IN}$.

Rearranging the expression to "bulk" all the constant scaling factors together yields, for instance:

$$\frac{\tau_{T_{ON\_eff}}}{V_{IN}} \cdot V_{TH_2} = \frac{V_{OUT}}{F_{SW} \cdot V_{IN}}$$

where $$\tau_{T_{ON\_eff}} = \frac{\tau_{T_{ON}}}{K'_{MIR} \cdot K_{IN}} \cdot K_{TON}$$

is an effective on-time parameter.

Considering an exemplary "simple" case where the scaling factor $K_{TON}$ is unitary, that is $K_{TON}=1$, the on-time $T_{ON}$ can be programmed using a selected $V_{OUT}$, e.g., by letting $V_{TH2}=V_{REF}$ so that the following expression holds, e.g.:

$$V_{TH_2} = \frac{V_{OUT}}{R_4} \cdot (R_1 + R_4) = \frac{V_{OUT}}{PART}$$

where PART is the voltage partitioning factor of the resistive network of the compensator circuit block 12.

Replacing the expression of $V_{TH2}$ in the expression obtained from that of the duty cycle yields, for instance:

$$\frac{\tau_{T_{ON\_eff}}}{V_{IN}} \cdot \frac{V_{OUT}}{PART} = \frac{V_{OUT}}{F_{SW} \cdot V_{IN}}$$

where $\tau_{T_{ON\_eff}}$ is a on-time constant value, leading to obtaining an expression between the effective on-time constant $\tau_{T_{ON\_eff}}$ and the switching frequency $F_{SW}$, e.g.:

$$\tau_{T_{ON\_eff}} = \frac{PART}{F_{SW}}$$

As exemplified herein, adjusting the switching frequency $F_{SW}$ comprises adjusting the effective time constant $\tau_{T_{ON\_eff}}$ of the PWM signal generator circuit block 30 according to the expression above.

In combination with the PWM signal generator circuit block 30, which supports output voltage $V_{OUT}$, switching frequency $F_{SW}$ programmability and input voltage $V_{IN}$ independence, as discussed in the foregoing, a similar analysis performed for the VCO circuit block 20 may yield:

$$T_{SW} = \tau_{VCO} \cdot \frac{K_{VCO} \cdot V_{TH} - COMP}{K_{MIR} \cdot V_{REF}}$$

where $\tau_{VCO}=C_{VCO}R_{VCO}$ is an effective VCO constant.

Considering an exemplary case where the VCO circuit block 20 facilitates $V_{OUT}$ programmability, e.g., when $V_{TH}=V_{REF}$, the switching period $T_{SW}$ can be expressed as:

$$T_{SW} =$$

-continued $$\tau_{VCO} \cdot \frac{V_{REF} \cdot (K_{VCO} - 1)}{K_{MIR} \cdot V_{REF}} = \tau_{VCO_{eff}} \cdot (K_{VCO} - 1) \Longrightarrow \tau_{VCO_{eff}} = \frac{T_{SW}}{K_{VCO} - 1}$$

In one or more embodiments, adjusting a switching frequency $F_{SW}$ comprises adjusting an effective VCO time constant for the modulator circuit block 14 and/or adjusting the effective time constant $\tau_{T_{ON\_eff}}$ of the PWM signal generator circuit block 30.

It is noted that, as a result of the above discussion, the modulator gain in absence of output variations (that is, at DC) is also a function of the effective time constants, that is:

$$(\delta/COMP) \cdot V_{IN} = \frac{\tau_{T_{ON_{eff}}}}{\tau_{VCO_{eff}}} \cdot \frac{V_{REF}^2}{(K_{VCO} \cdot V_{REF} - V_{REF})^2} = \frac{PART}{K_{VCO} - 1}$$

This may facilitate an invariant loop stability with respect to any of the programmed value of $V_{OUT}$, $F_{SW}$ or $V_{IN}$.

In one or more embodiments, the scaling factor $K_{VCO}$ can be used to adjust the difference between the DC gain (e.g., $V_{OUT}$/COMP=PART) and the AC small signal gain $$\frac{d\overline{SW}}{dCOMP}$$

of the compensator 12. For instance, the quadratic dependence of the modulator gain GMOD from the output of the compensator COMP facilitates differentiating among the two, save for the case where they are equal when $K_{VCO}=2$.

In one or more embodiments, the reference voltage VREF may be selected within a range limited by a digital-to-analog converter (DAC), e.g., about 0 to 1.5 Volts. This may also limit a dynamic range of the voltage at the input of the comparator circuit block 204 in the VCO circuit block 20.

In one or more embodiments, the scaling factor $K_{VCO}$ may be selected to have a value about 1.5, leading to a reference voltage threshold VIE in a range about 0-2.25 V. As a result, the (small signal) gain of the modulator circuit block 14 may be equal to twice the partitioning factor PART of the compensator circuit block 12.

In one or more embodiments, the resistive components $R_1$, $R_4$ in the compensator circuit block 12 may be selected to provide a voltage partitioning factor PART in a range about 1.25-2.5. Specifically, a lower end of the range may be selected in case of a single range mode and for output voltage values $V_{OUT}$ in a range about 0.5-1.875 Volts, while a higher end of the PART range may be suitable for a double range mode with output voltage $V_{OUT}$ having values about 1.875-3.75 Volts.

For a selected value of the scaling factor, e.g., $K_{VCO}=1.5$, it follows a selected value of the effective VCO time constant, e.g., $\tau_{VCO_{eff}}=2 \cdot T_{SW}$.

In one or more embodiments, the switching frequency may be selected in a set of frequency values, e.g. {0.50; 0.75; 1.00; 1.50} MHz. Accordingly, the effective time constant for the VCO may take one of the (e.g., four) values of a corresponding set of values computed as discussed in the foregoing, e.g., {4.00; 2.66; 2.00; 1.33} μs.

For instance, any one of these values may be selected for the modulator 14 using the trimmable resistance $R_{VCO}$. Alternatively, or in addition, a trimmable capacitance $C_{VCO}$ may be used, in order to reduce variability of the high frequency pole for the voltage-current conversion amplifier 200, facilitating stability analysis thereof.

In one or more embodiments, both trimmable resistances of the VCO circuit block 20 and of the PWM signal generator circuit block 30 may be selected to have same properties (e.g., $R_{VCO}=R_{TON}$). In this exemplary case, the value of capacitance $C_{VCO}$ may be expressed as:

$$\tau_{VCO_{eff}} = \frac{\tau_{VCO}}{K_{MIR}} = \frac{C_{VCO} \cdot R_{VCO}}{K_{MIR}} \Rightarrow C_{VCO} = \frac{2 \cdot T_{SW} \cdot K_{MIR}}{R_{VCO}}$$

In the exemplary case considered, the corresponding effective on-time constant $\tau_{T_{ON\_eff}}$ may have a value selected in a set of values, for instance values $\tau_{T_{ON\_eff}}=\text{PART} \cdot \{2.00; 1.33; 1.00; 0.67\}$ μs.

For instance, assuming (for the sake of simplicity) unitary scaling on-time factor $K_{TON}=1$, the capacitance of the on-time generator $C_{TON}$ may be expressed as:

$$C_{TON} = \frac{T_{SW} \cdot PART \cdot K_{MIR} \cdot K_{IN}}{R_{TON}}$$

In one or more embodiments, the capacitance $C_{VCO}$ may be adjustable among a first set of values, e.g., $C_{VCO}=\{15.0; 10.0; 7.50; 5.00\}$ pF, and the capacitance $C_{TON}$ may be adjustable among a second set of values, $C_{TON}=\{7.50; 5.00; 3.75; 2.50\}$ pF.

In one or more embodiments it may be possible to use a reduced set of selectable values for the capacitance $C_{TON}$ thanks to the presence of the mirroring factor $K_{MIR}$.

As exemplified herein, a method comprises controlling a switching stage (for instance, 11) of an electronic converter (for instance, 10) as per the present disclosure via the circuit (for instance, 14) as per the present disclosure.

As exemplified herein, an electronic converter (for instance, 10) comprises:
  a first node (for instance, $V_{IN}$) configured to receive an input voltage (for instance, $V_{IN}$) from an energy source,
  a second node (for instance, $V_{OUT}$) configured to provide a regulated output voltage (for instance, $V_{OUT}$) to a load (for instance, $Z_L$),
  a load (for instance, $Z_L$) coupled to the second node to receive the regulated output voltage therefrom,
  a third node (for instance, SW) coupled to a reactive network (for instance, L, $C_{OUT}$) referred to ground,
  a first electronic switch (for instance, HS) having a current flow path therethrough coupled intermediate the first node and the third node and a second electronic switch (for instance, LS) having a current flow path therethrough coupled intermediate the third node and the second node, the first electronic switch and the second electronic switch having respective control nodes,
  a (modulator) circuit (for instance, 14) as per the present disclosure coupled to the control nodes of the first and second electronic switches of the switching stage to provide thereto at least one pulse-width modulated, PWM, drive signal (for instance, PM) based on a clock signal (for instance, CK), the input voltage level and a reference voltage (for instance, $V_{REF}$).

As exemplified herein, a circuit (for instance, 14, 110, 112) configured to drive one or more electronic switches (for instance, LS, HS) in a switching stage (for instance, 11) of an electronic voltage regulator (for instance, 10) providing a regulated output voltage at an output node (for instance, $V_{OUT}$) from an input voltage received at an input node (for instance, $V_{IN}$), the switching stage configured to be coupled to a reactive network (for instance, L, $C_{OUT}$) referred to ground, comprises:
  a voltage-controlled oscillator, VCO, circuit (for instance, 20) comprising a first node (for instance, $V_{REF}$) configured to receive a reference voltage, a second node (for instance, COMP) configured to receive a feedback signal (for instance, COMP) indicative of a variation of the regulated output voltage with respect to the reference voltage, and a third node (for instance, CK) configured to provide a clock signal having a clock period (for instance, $T_{SW}$) which is a function of the reference voltage and the feedback signal, and
  a pulse-width modulated, PWM, signal generator circuit (for instance, 30) comprising a first node coupled to the VCO circuit and configured to receive therefrom the clock signal (for instance, CK), which is a function of the reference voltage and the feedback signal, a second node (for instance, $K_{IN}V_{IN}$) configured to receive an input signal proportional to the input voltage signal, and a third node configured to provide at least one PWM drive signal (for instance, PM) to one or more of the electronic switches of said switching stage based on the clock signal, the input signal proportional to the input voltage signal, wherein the PWM signal generator circuit is configured to produce said at least one PWM drive signal with a duty cycle (for instance, $\delta=T_{ON}/T_{SW}$), that is a ratio between a fraction of the period in which the PWM drive signal it is at a first "active" level and the signal period, that is inversely proportional to the feedback signal indicative of a variation of the regulated output voltage with respect to said reference voltage.

As exemplified herein, wherein the VCO circuit comprises:
  signal processing circuitry (for instance, 200, $C_{VCO}$, $M_{VCO}$) coupled to the first input node and to the second input node and configured to produce a first signal (for instance, VCO_RAMP) as a function of the feedback signal and the reference voltage, and
  a comparator circuit (for instance, 204) comprising a first input node (for instance, VCO_RAMP) coupled to the signal processing circuitry and configured to receive the first signal therefrom, a second input node (for instance, $V_{TH}$) configured to receive a second signal (for instance, $V_{TH}$) proportional to the reference voltage level, and an output node (for instance, CK) configured to provide the clock signal.

For instance, the comparator circuit is configured to perform a comparison of the first signal with said second signal and to produce the clock signal based on said comparison of the first signal with the second signal.

As exemplified herein, the signal processing circuitry in the VCO circuit comprises a current generator (for instance, 202) configured to produce a reference current based on the reference voltage level, a capacitance (for instance, $C_{VCO}$) having a first capacitance node coupled to the current generator to receive the reference current therefrom and coupled to the second input node of the comparator circuit, the capacitance having a second capacitance node coupled to the second node of the VCO circuit to receive the said feedback signal therefrom, and a transistor (for instance, $M_{VCO}$) having a control node coupled to the output node of the comparator circuit to receive the clock signal therefrom, a first node coupled to the first capacitance node and a second node coupled to the second capacitance node, the transistor having a current path therethrough between the first node and the second node, the current path configured to be made selectively conductive and non-conductive in response to the clock signal having a first value and a second value, respectively, wherein the capacitance is charged or discharged as a function of said reference current produced via the current generator when the current path through the transistor is made non-conductive or conductive in response to the clock signal having a first value and a second value, respectively.

As exemplified herein, the PWM signal generator circuit is configured to control the duty cycle (for instance, δ) of the PWM drive signal based on the reference voltage signal level, the input voltage signal and the clock signal.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection. The extent of protection is defined by the annexed claims.

What is claimed is:

1. A circuit comprising:
    a voltage-controlled oscillator (VCO) circuit comprising:
        a first node configured to receive a reference voltage;
        a second node configured to receive a feedback signal, which is a comparison signal, indicative of a variation of a regulated output voltage of an electronic voltage regulator with respect to the reference voltage; and
        a third node configured to provide a clock signal having a clock period based on the reference voltage and the comparison signal; and
    a pulse-width modulated (PWM) signal generator circuit comprising:
        a first node coupled to the VCO circuit and configured to receive the clock signal;
        a second node configured to receive an input signal proportional to an input voltage signal at an input node of the electronic voltage regulator; and
        a third node configured to provide at least one pulse-width modulation (PWM) drive signal to one or more electronic switches of a switching stage of the electronic voltage regulator based on the clock signal,
    wherein the input signal is proportional to the input voltage signal, and
    wherein the at least one PWM drive signal has a duty cycle that is inversely proportional to the comparison signal indicative of the variation of the regulated output voltage with respect to the reference voltage.

2. The circuit of claim 1,
    wherein the switching stage is coupled to a reactive network via a switching node, and
    wherein the reactive network is connected to ground.

3. The circuit of claim 2,
    wherein the comparison signal has a DC operating point equivalent to a level of the reference voltage, and
    wherein an average value of a voltage at the switching node varies as a function of the comparison signal.

4. The circuit of claim 3, wherein the function is a function of a variation in a voltage domain of the comparison signal with respect to the level of the reference voltage.

5. The circuit of claim 1, wherein the VCO circuit comprises:
    signal processing circuitry coupled to the first node of the VCO circuit and to the second node of the VCO circuit and configured to provide a first signal as a function of the comparison signal and the reference voltage; and
    a comparator circuit comprising:
        a first input node coupled to the signal processing circuitry and configured to receive the first signal;
        a second input node configured to receive a second signal proportional to a level of the reference voltage; and
        an output node configured to provide the clock signal,
        wherein the comparator circuit is configured to
            compare the first signal with the second signal, and
            produce the clock signal based on a comparison of the first signal with the second signal.

6. The circuit of claim 5, wherein the signal processing circuitry comprises:
    a current generator configured to produce a reference current based on the level of the reference voltage; and
    a capacitance comprising:
        a first capacitance node coupled to the current generator and configured to receive the reference current and coupled to the first input node of the comparator circuit; and
        a second capacitance node coupled to the second node of the VCO circuit and configured to receive the comparison signal; and
    a transistor comprising:
        a control node coupled to the output node of the comparator circuit and configured to receive the clock signal therefrom;
        a first node coupled to the first capacitance node; and
        a second node coupled to the second capacitance node, the transistor having a current path therethrough between the first node and the second node,
        wherein the current path is selectively conductive and non-conductive in response to the clock signal having a first value and a second value, respectively, and
        wherein the capacitance is charged or discharged as a function of the reference current when the current path through the transistor is non-conductive or conductive in response to the clock signal having the first value and the second value, respectively.

7. The circuit of claim 5,
    wherein an amplitude of the first signal is inversely proportional to the comparison signal, and
    wherein the clock period of the clock signal varies as a function of the amplitude of the first signal.

8. The circuit of claim 1, wherein the PWM signal generator circuit is configured to control the duty cycle of the PWM drive signal based on a level of the reference voltage, the input voltage signal and the clock signal.

9. The electronic voltage regulator comprising:
    a first node configured to receive an input voltage from an energy source;
    a second node configured to provide the regulated output voltage to a load;
    a switching node coupled to a reactive network that is connected to ground;
    a first electronic switch having a current flow path therethrough coupled between the first node and the switching node and a second electronic switch having a current flow path therethrough coupled between a third node and the switching node, the first electronic switch and the second electronic switch having respective control nodes; and the circuit of claim 1, comprising the VCO circuit and the PWM signal generator, coupled to the control nodes of the first and second electronic switches to provide the at least one PWM drive signal based on the clock signal, a level of the input voltage and the reference voltage.

10. A method for providing at least one pulse-width modulated (PWM) drive signal, the method comprising:

receiving, at a first node of a circuit, a reference voltage;

receiving, at a second node of the circuit, a feedback signal, which is a comparison signal, indicative of a variation of a regulated output voltage of an electronic voltage regulator with respect to the reference voltage; and providing, at a third node of the circuit, the at least one PWM drive signal to one or more electronic switches of a switching stage of the electronic voltage regulator, wherein the at least one PWM drive signal, provided by a PWM signal generator circuit, is based on a clock signal and an input signal proportional to an input voltage signal at an input node of the electronic voltage regulator, and wherein the clock signal, provided by a voltage-controlled oscillator (VCO) circuit, has a clock period based on the reference voltage and the comparison signal, wherein the input signal is proportional to the input voltage signal, and wherein the at least one PWM drive signal has a duty cycle that is inversely proportional to the comparison signal indicative of the variation of the regulated output voltage with respect to the reference voltage.

11. The method of claim 10, wherein the switching stage is coupled to a reactive network via a switching node, and wherein the reactive network is connected to ground.

12. The method of claim 11, wherein the comparison signal has a DC operating point equivalent to a level of the reference voltage, and wherein an average value of a voltage at the switching node varies as a function of the comparison signal.

13. The method of claim 12, wherein the function is a function of a variation in a voltage domain of the comparison signal with respect to the level of the reference voltage.

14. The method of claim 10, wherein the at least one PWM drive signal includes the duty cycle based on a level of the reference voltage, the input voltage signal and the clock signal.

15. The method of claim 10, further comprising providing, by a signal processing circuitry of the VCO circuit, a first signal as a function of the comparison signal and the reference voltage to a comparator circuit of the VCO circuit.

16. The method of claim 15, further comprising:

receiving, by the comparator circuit, the first signal;

receiving, by the comparator circuit, a second signal proportional to a level of the reference voltage;

comparing, by the comparator circuit, the first signal with the second signal; and providing the clock signal based on a comparison of the first signal with the second signal.

17. The method of claim 15, wherein an amplitude of the first signal is inversely proportional to the comparison signal, and wherein the clock period of the clock signal varies as a function of the amplitude of the first signal.

18. The method of claim 15, wherein the VCO circuit comprises a current generator for producing a reference current based on a level of the reference voltage.

19. The method of claim 18, further comprising:

receiving, by a capacitance of the VCO circuit, the reference current from the current generator; and receiving, by the capacitance, the comparison signal, wherein a transistor is coupled to the capacitance so that a control node of the transistor receives the clock signal and so that a current path of the transistor, coupled between two nodes of the capacitance, is selectively conductive and non-conductive in response to the clock signal having a first value and a second value, respectively, and wherein the capacitance is charged or discharged as a function of the reference current when the current path through the transistor is non-conductive or conductive in response to the clock signal having the first value and the second value, respectively.

* * * * *